United States Patent [19]

Lang-Ree et al.

[11] 4,154,152
[45] May 15, 1979

[54] THERMALLY SHIELDED GAS BROILER

[75] Inventors: Nils Lang-Ree, Los Altos; John S. Brown, Half Moon Bay, both of Calif.

[73] Assignee: NPI Corporation, Burlingame, Calif.

[21] Appl. No.: 883,929

[22] Filed: Mar. 6, 1978

[51] Int. Cl.² .............................................. A47J 37/00
[52] U.S. Cl. ...................................... 99/386; 99/339; 99/391; 99/401; 99/443 C
[58] Field of Search ............... 126/41 C; 99/386, 387, 99/389, 391, 393, 401, 339, 443 C, 447

[56] References Cited

U.S. PATENT DOCUMENTS

| 784,854 | 3/1905 | Grace | 126/41 C |
|---|---|---|---|
| 2,238,309 | 4/1941 | Cramer | 99/386 |
| 2,453,385 | 11/1948 | Rone | 99/389 |
| 3,460,461 | 8/1969 | Langsam | 99/386 |
| 3,580,164 | 5/1971 | Baker | 99/386 |
| 3,604,336 | 9/1971 | Straub | 99/386 |
| 4,023,007 | 5/1977 | Brown | 99/386 |

Primary Examiner—Billy J. Wilhite
Attorney, Agent, or Firm—Lothrop & West

[57] ABSTRACT

A broiler for hamburger patties and the like has a partially enclosed frame with a feeding opening therein. An endless conveyor on the frame has a generally horizontal upper run accessible through the opening and passing a predetermined distance below a first gas burner on the frame. A radiant energy shield is disposed between the gas burner and the opening. A second gas burner is on the frame below the upper run substantially the same predetermined distance, the lower run of the conveyor running in a path arched upwardly over the second gas burner. Another radiant energy shield is disposed between the second gas burner and the opening. There are also trays on the frame to receive patties from the first conveyor and also to receive buns from a second, separately heated bun conveyor on the frame.

3 Claims, 1 Drawing Figure

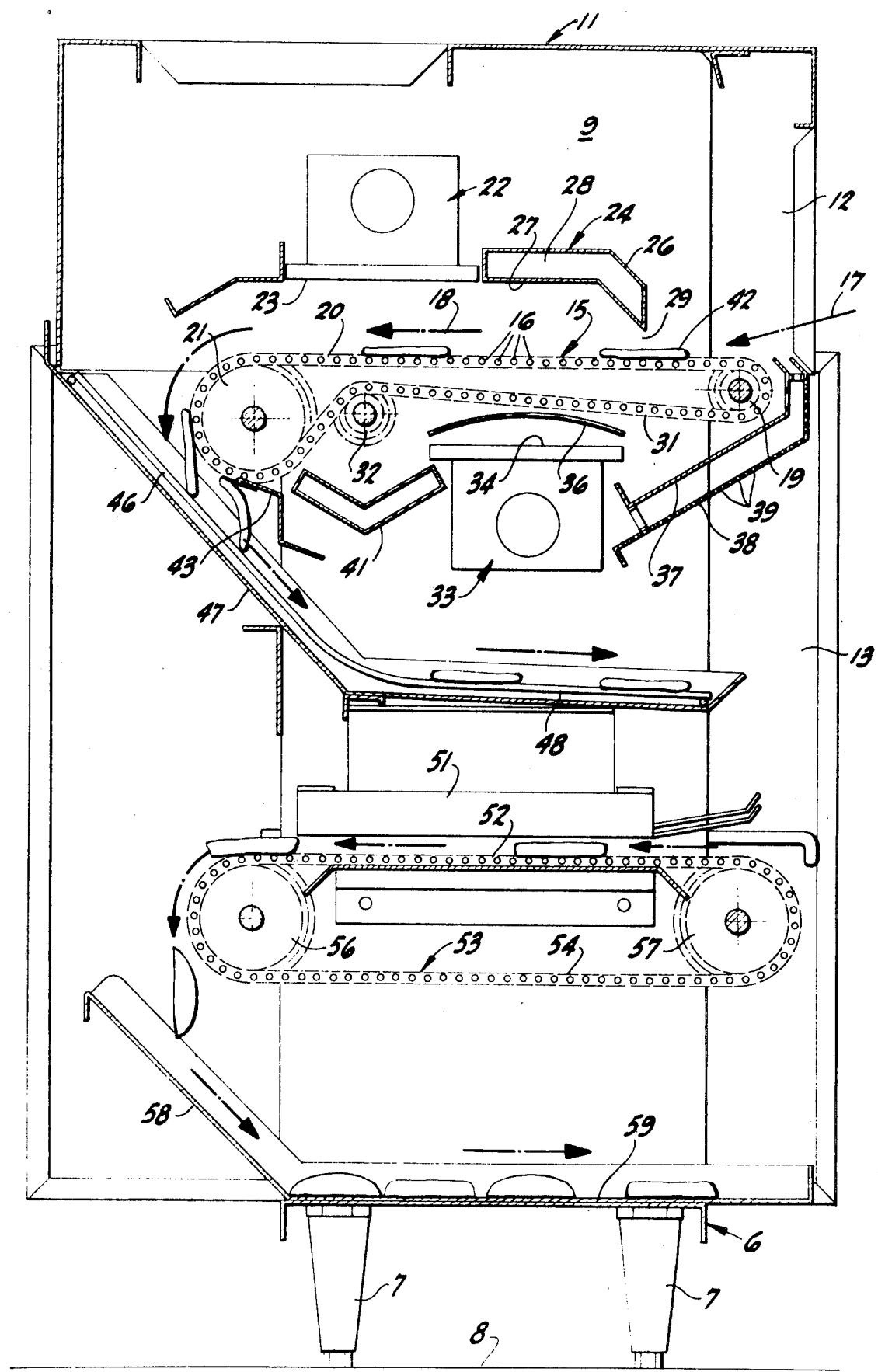

THERMALLY SHIELDED GAS BROILER

CROSS-REFERENCES TO RELATED APPLICATIONS

Of interest may be application Ser. No. 877,378 filed Feb. 13, 1978 and assigned to the assignee hereof.

BRIEF SUMMARY OF THE INVENTION

In the modern preparation of quantities of fast foods, it is important not only to produce a satisfactory product, but to do so with the conservation of as much energy as possible. This, in the present case, is accomplished by utilizing gas burners positioned in an operating device in special relationship to each other and in special relationship to the upper run of an endless conveyor on which the patties are advanced. Particular positioning of the burners and the provision of radiant heat shields between the burners and the feeding opening to the conveyor result in a substantial conservance of energy.

BRIEF DESCRIPTION OF THE DRAWING

The drawing FIGURE is a cross-section on a vertical, longitudinal plane through one form of energy shielded or thermally shielded gas broiler constructed pursuant to the invention.

DETAILED DESCRIPTION

Although the present device is useful in many different environments and for cooking various different items, it is disclosed herein as it has successfully been embodied primarily to provide fast food items such as hamburger patties and accompanying warmed buns. The particular concern herein is with the patty portion of the structure. There is provided a frame 6 supported on legs 7 on the customary floor 8, the frame extending upwardly to a sufficient height for convenient use. The frame includes various sheet metal panels 9 and the like so as to provide at least a partial enclosure on the sides of the frame and in part across the top 11 thereof. At the front of the partially enclosed frame, there is left a feeding opening 12 and also a serving opening 13.

Disposed on the frame in close relationship to the feeding opening 12 is an endless conveyor 15. This conveniently is made up of a number of metal rods 16 arranged parallel to each other and extending in a direction crosswise to the direction of advance of the conveyor as indicated by the arrows 17 and 18. The cross rods 16 are linked or articulated at their ends to make a belt-like conveyor. The conveyor is conveniently trained around an initial, relatively small sprocket 19 and a final, relatively large sprocket 21. There is thus afforded a generally planar, horizontal, belt-like upper run 20 adjcent the lower portion of the opening 12.

Arranged above the upper run 20 at a convenient, predetermined distance thereabove is a first gas burner 22 supported on the frame and extending substantially across the conveyor. The gas burner is of well-known sort achieving a mixture within itself of fuel gas and some combustion air. The burner provides surface combustion on the lower boundary 23 thereof. There is afforded a generally planar sheet of luminous, combustible material at the predetermined distance above the conveyor upper run. The positioning of the first burner 22 is preferably with the burner toward the latter part of the run of the conveyor, so that the finish of the patties thereon is to specifications.

In order to conserve energy and to prevent substantial radiation from the burner 22 through the opening 12, there is provided on the frame and between the gas burner 22 and the opening 12 a radiant energy barrier or shield 24. This is conveniently a body comprised of an outer metal sheet 26 and an inner metal sheet 27 appropriately spaced apart to define between them, and with the aid of side and end walls, a closed chamber 28 within which air is confined. This construction tends to reduce heat transfer by convection. The effect of the heat shield is enhanced by providing a bright finish on the exterior surfaces of the metal, so that the radiation from the luminous combustion in the area 23 is effectively directed onto the conveyor and prevented from escaping from the general area of the conveyor. To this end, a portion of the heat shield is directed downwardly so as to leave a relatively narrow or shallow opening 29 between the radiant shield and the conveyor.

The conveyor 15 has a lower run 31 that extends between the sprockets 19 and 21, but is particularly directed to follow an upwardly arched path by reason of idler sprockets 32 or wheels on the main frame adjacent the sprocket 21.

Located within the arched path so provided and adjacent the lower run 31 is a second gas burner 33 of the same general nature as the burner 22 but disposed with its upper luminous surface 34 at about the same predetermined distance below the upper run 20 as the surface 23 is above such run. The second burner 33 is also staggered longitudinally with respect to the first burner and is located about midway of the length of the conveyor chain. The second burner is protected by an arched shield 36 above the combustion surface, so that materials falling from the conveyor do not fall directly onto the flame surface, but are deflected to either side.

As in the case of the upper burner, there is likewise provided a second radiant heat shield 37 located on the frame between the second gas burner 33 and the opening 12, the reflector 37 being directed so as to confine radiation from the second burner to the forward portion of the conveyor, the upper sheet 37 being of relatively bright metal so as to reflect back radiation from the upper burner 22 and also from the lower burner 33. In this instance, although the shield has an additional sheet 38 included in it, it is not necessarily closed at the ends. Rather, the sheet 38 is itself provided with a number of perforations 39, so that the metal of the sheet 38 does not become excessively hot to the touch, because it is in an area near the opening 13 that may be contacted by the user. There is some air circulation between the sheets 37 and 38, so that the radiation barrier, while effective for radiation, is not quite as good a convection barrier as is the first shield 24. Even so, a substantial amount of energy is retained. If desired, it is also feasible to provide another radiation shield 41 disposed between the second burner 33 and the lower run of the conveyor and effective not only to confine some of the heat to the vicinity of the conveyor, but also to reflect heat to the first burner 22 and also to the second burner 33.

By the special positioning of the gas burners and the interposition of the several radiant shields, it is possible to reduce the fuel consumption of the unit over past practice by a substantial factor since heat is confined to the general vicinity of the conveyor and particularly is provided about equally in both directions, both from above and from below, to the upper run 20.

In use, an attendant places a hamburger patty 42 on the upper run 20, the patty passing under the leading edge of the first shield 24 and being primarily subjected initially to upwardly radiating heat and convective heat from the second burner 33. This begins the cooking of the patty somewhat earlier on the lower side than on the top side, partially to compensate for the blocking effect of the rods 16 or bars of the conveyor.

As the patty advances in the direction of the arrow 18, for example, its upper side is then subjected to radiation from the burner 22, and the cooking of the patty on both sides is then substantially uniform, largely due to the spacing of the two burner elements substantially equidistantly from the upper run of the conveyor. At the end of its traverse of the upper run, a patty moves around the curved portion of the conveyor and drops therefrom by gravity or, if it tends to adhere to the bars, is actually scraped off by a doctor 43. In any case, the patty falls onto rods 46 included in a patty slide 47 mounted on the frame and directing the patties to travel by gravity onto a storage rack 48 accessible through the opening 13. In reaching for a patty, the user is protected from heat from the second burner 33 by the perforated plate 38.

While this mechanism is sufficient to take care of patties, it is usually the case that there is incorporated on the same frame means for heating the accompanying buns.

While there is some heat that escapes from the upper portion of the structure to the lower portion, nevertheless there is conveniently provided an electrically energized bun platen 51 on the frame in close juxtaposition with the upper run 52 of an endless conveyor generally designated 53 and having a return lower run 54, the conveyor being trained around sprockets 56 and 57 on the frame. Buns introduced onto the upper run and passing below the electrically heated bun platen 51 fall by gravity off the far end of the conveyor onto a bun chute 58 leading the buns to rest by gravity on the lower portion 59 of the bun chute available through the opening 13 for assembly with patties from the rack 48.

There has thus been provided a relatively simple, energy conserving machine for providing both the patty ingredient and the bun ingredient for a hamburger-bun combination.

We claim:

1. A thermally shielded gas broiler comprising a frame, a housing on said frame and having an opening therein, an endless conveyor, means for supporting said conveyor on said frame with the upper run of said conveyor extending substantially horizontally adjacent said opening and with the lower run of said conveyor extending in an upwardly arched path, a first surface combustion gas burner on said frame and providing a sheet of luminous combustible material disposed a predetermined distance above said upper rum, a first radiant heat shield including a pair of parallel metal sheets having a bright exterior finish, said first radiant heat shield being disposed on said frame above said upper run and substantially between said first gas burner and said opening, a second surface combustion gas burner on said frame and disposed substantially said predetermined distance below said upper run and adjacent said upwardly arched path, and a second radiant heat shield including a pair of parallel metal sheets having a bright exterior finish disposed on said frame below said conveyor runs and between said second gas burner and said opening.

2. A device as in claim 1 in which the one of said pair of metal sheets of said second radiant heat shield disposed closer to said opening is provided with a number of perforations.

3. A device as in claim 1 in which said first radiant heat shield is spaced from said opening a distance along said conveyor upper run at least as great as the diameter of a hamburger patty.

* * * * *